(No Model.)

J. STROUD.
MEAT ROASTER.

No. 453,418. Patented June 2, 1891.

Witnesses:
Grant Squires
Frederick S. Norman

Inventor:
James Stroud

UNITED STATES PATENT OFFICE.

JAMES STROUD, OF NEW YORK, N. Y.

MEAT-ROASTER.

SPECIFICATION forming part of Letters Patent No. 453,418, dated June 2, 1891.

Application filed May 13, 1890. Serial No. 351,690. (No model.)

*To all whom it may concern:*

Be it known that I, JAMES STROUD, a citizen of the United States, residing at No. 120 West Thirty-fifth street, in the city of New York, N. Y., have invented a new and useful Meat-Roaster, of which the following is a specification.

My invention relates to improvements in meat-roasters, in which there is a combination of two vessels or pans; and the objects of my improvements are, first, to cook, brown, and roast meat by the combination of steam and hot air; second, to obviate the necessity of basting and personal attention while attaining as good or a better result; third, to prevent burning the meat or juices, and, fourth, to preserve the juices of the meat, and I attain these objects by means of two vessels or pans illustrated in the accompanying drawings, in which—

Figure 1:
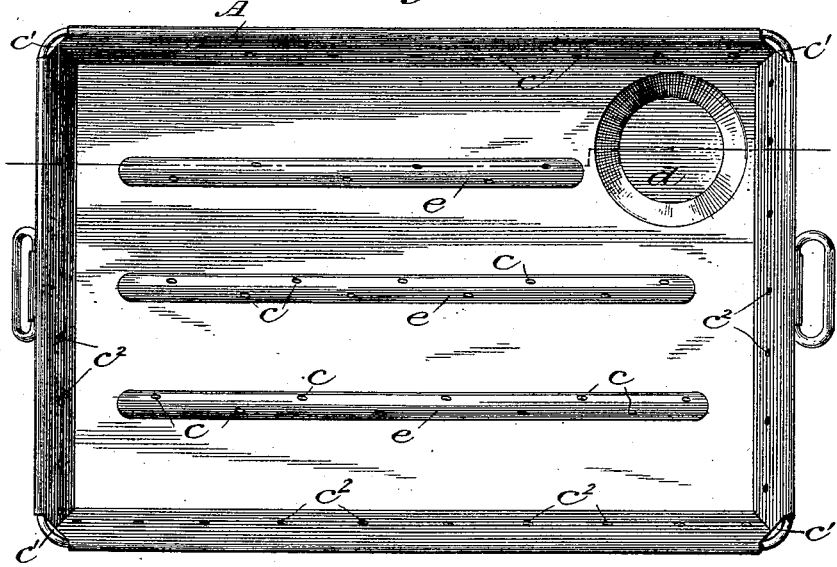
Figure 2:
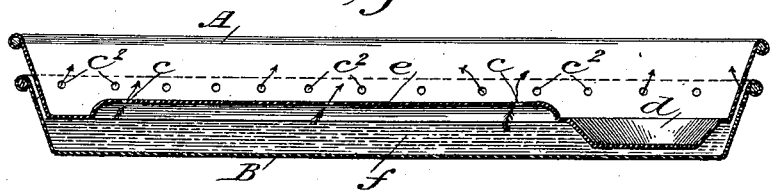

Figure 1 is a view of the upper vessel or pan; and Fig. 2 is a sectional view of the two vessels, one within the other as in use.

Similar letters refer to similar parts throughout both views.

The upper vessel or pan A rests within the lower vessel or pan B by means of the overlapping edges of the upper vessel or pan, leaving a space $f$ between the upper surface of the bottom of the lower vessel or pan and the under surface of the bottom of the upper vessel or pan. Upon the upper surface of the bottom of the upper vessel or pan are ridges $e\ e\ e$, upon which to rest the meat, and these ridges are provided with spaces or orifices $c\ c\ c\ c$ to allow for the escape of steam during the process of cooking. At some place $d$ in the surface of the bottom of the upper vessel or pan there is a depression to allow the collection of juices or gravy. At the corners the vessels or pans are so shaped as to allow small spaces or orifices $c'\ c'$ between the two vessels or pans. Similar spaces or orifices, as $c^2$, may also occur in the wall of the upper vessel or pan at any point along the sides thereof. Said spaces or orifices allow the passing from the space $f$ of steam generated from the water.

In use the space $f$ is filled to about half its depth with water. The meat is placed upon the ridges $e\ e\ e$. The upper vessel or pan A is placed within the lower vessel or pan, as in Fig. 2. The vessels or pans are then placed in the stove, oven, or other heating apparatus. The water in the space $f$ boils, generating steam. The steam passes to the meat through the openings or orifices $c\ c^2$ in the body of the pan A, as above described. The meat is cooked by the combination of the hot air from the heating apparatus and the steam. By this means the meat is cooked, roasted, and browned without personal attention after putting it in place, as above described, and without burning, and with a result as good or better than that accomplished by the ordinary basting, and the juices are saved. The juices flowing from the meat collect in the depression $d$, facilitating basting, if desired.

I am aware that gridirons have heretofore been made with corrugations upon which to place the meat, and also with receptacles for juices, and therefore I do not claim the same, broadly; but What I do claim as my invention, and desire to secure by Letters Patent, is—

The combination of the pan A, provided with the ridges $e\ e$ in its bottom, and the orifices $c^2\ c^2\ c^2$, located in the walls of the said pan below its overlapping edge, and the orifices $c\ c\ c$ in said ridges, with the pan B, the pan A being supported by and within the pan B, so as to leave a water and steam space between the bottoms of said pans, substantially as and for the purpose set forth.

JAMES STROUD.

In presence of—
WALTER H. GRIFFIN,
GRANT SQUIRES.